United States Patent [19]

Hubred et al.

[11] 4,434,140
[45] Feb. 28, 1984

[54] STRIPPING A SOLUTION CONTAINING MOLYBDENUM AND VANADIUM VALUES

[75] Inventors: Gale L. Hubred, Richmond; Dean A. Van Leirsburg, Petaluma, both of Calif.

[73] Assignee: Chevron Research Company, San Francisco, Calif.

[21] Appl. No.: 422,814

[22] Filed: Sep. 24, 1982

[51] Int. Cl.$^3$ ............... C01G 39/00; C01G 31/00
[52] U.S. Cl. ........................... 423/54; 423/63; 423/139; 75/101 BE
[58] Field of Search ............... 423/54, 63, 139; 75/101 BE

[56] References Cited

U.S. PATENT DOCUMENTS 3,083,085 3/1963 Lewis et al. .................... 423/63
3,320,024 5/1967 Burmell ........................... 423/63

Primary Examiner—Herbert T. Carter
Attorney, Agent, or Firm—D. A. Newell; S. R. La Paglia; V. J. Cavalieri

[57] ABSTRACT

A method of stripping an organic extraction solvent containing quaternary alkyl ammonium complexes. The extraction solvent is contacted with an aqueous stripping solution having at least 75 g/l bicarbonate ion, while maintained at between pH 7 and 9 at a temperature of no more than 50° C.

4 Claims, 3 Drawing Figures

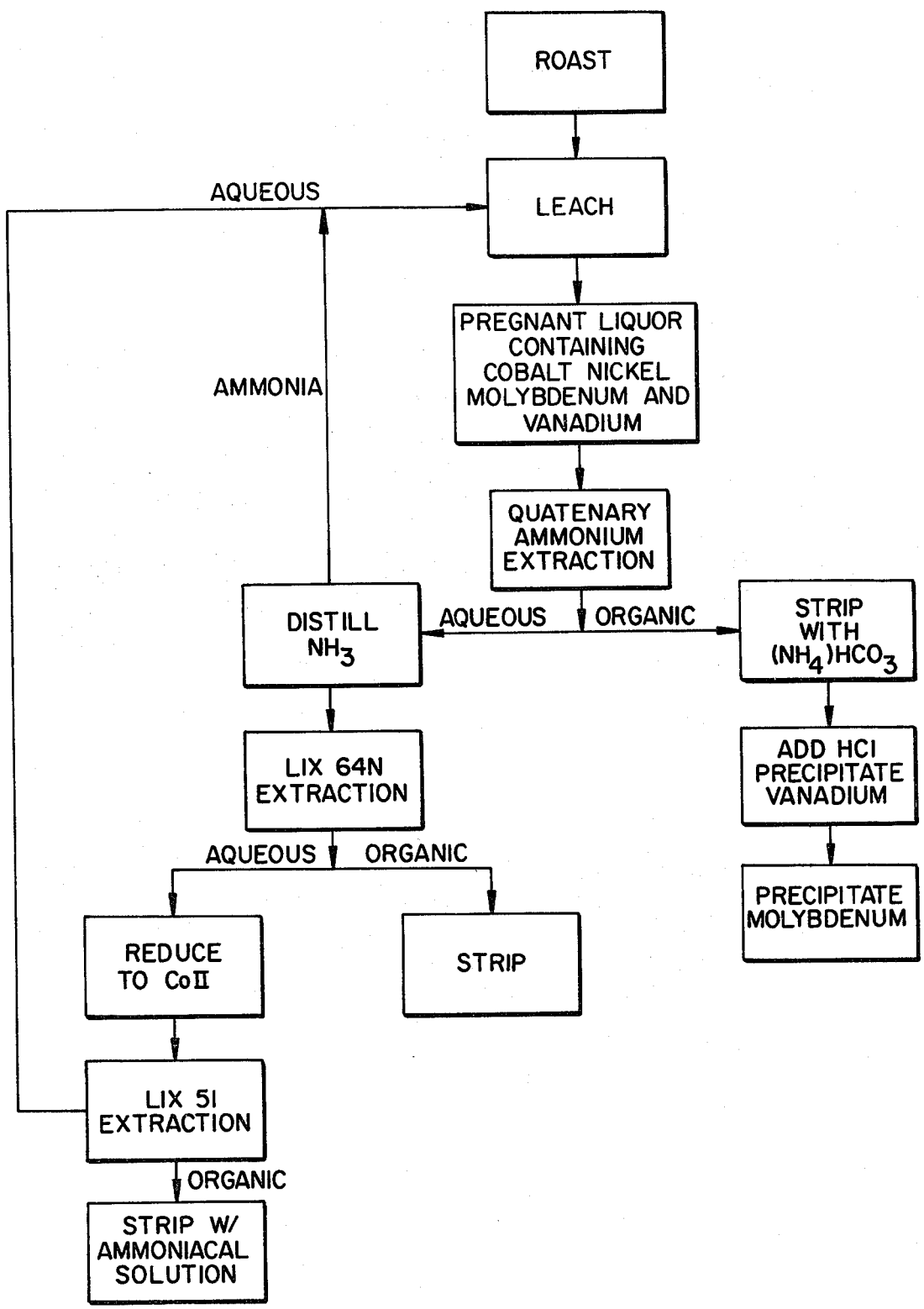
FIG._1.

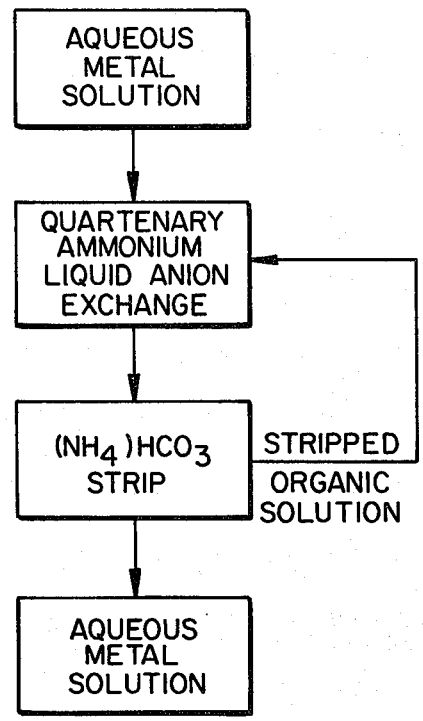
FIG._2.

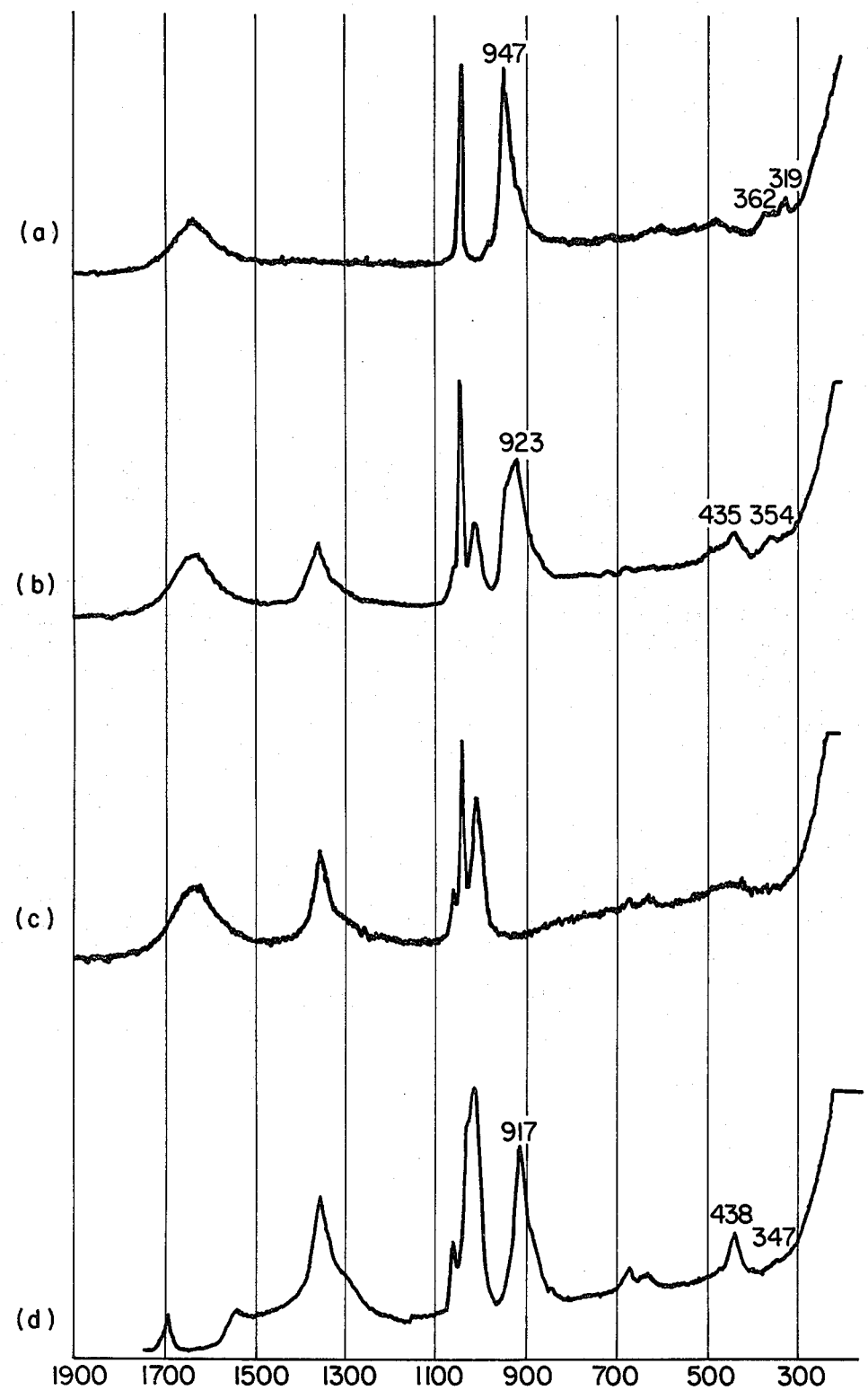
FIG._3.

STRIPPING A SOLUTION CONTAINING MOLYBDENUM AND VANADIUM VALUES

BACKGROUND OF THE INVENTION

This invention relates to methods of stripping extracted constituents from organic extractants. More particularly, this invention relates to methods of stripping constituents from quaternary amine extractants.

A number of important hydrometallurgical processes involve the extraction of metal species in the form of anionic metal complexes from aqueous pregnant liquors, and subsequent stripping of the metal values from the organic phase into an aqueous phase. Such extracting and stripping processes are especially important in the hydrometallurgy of Group V and Group VI metals. One particularly important source of aqueous pregnant liquors containing both Group V and Group VI metal values is the pregnant liquor produced from leaching spent hydroprocessing catalysts.

The chemistry of Group V and Group VI metals in aqueous solution is particularly complex. Each metal in both Groups forms a variety of oxidation states that can in turn form a variety of oxygen-containing anions in aqueous solution. These metal-oxygen complexes undergo complex reactions in aqueous solution that depend on such variables as pH, temperature, concentration and chemical environment. Each metal of the Group V and Group VI undergoes reactions at unique conditions. The complex aqueous chemistry of Group V and Group VI metals makes the liquid-liquid phase transfer processes particularly difficult, especially if more than one metal species of Group V and Group VI are present.

Crude oils frequently contain metals, particularly iron, nickel and vanadium. Spent hydroprocessing catalysts that have been in contact with metals containing crude or residual oil can therefore contain both molybdenum, a frequent catalytic metal, and vanadium. Extracting and stripping the vanadium values and the molybdenum values simultaneously from a leach liquor from spent catalysts therefore presents a difficult and subtle problem.

It is preferred, that if the metals from catalysts are to be recovered by hydrometallurgical techniques, that the total flow scheme be one that allows maximu recycle of reagents and minimum introduction of extraneous ions. Since one preferred recovery system involves an aqueous ammoniacal leach using ammonium carbonate, it is preferred that only ammonia, ammonium ion or carbonate ion be added to the aqueous streams. This self-imposed limitation complicates the recovery scheme of Group V and Group VI metals even more.

It is possible, at pH values in the range of about 3 to about 5, to extract both molybdenum and vanadium into an organic phase by use of a quaternary amine as a liquid anion exchange reagent. One such reagent is tricapryl methyl ammonium chloride, which is sold under the trade name Alaquat 336 ® by the Henkel Chemical Company.

Alaquat and related compounds that have extracted constituents from Group V and Group VI on them tend to be difficult to strip, especially if the strip is to be chemically compatible with the leach. In U.S. Pat. No. 3,083,085 an aqueous solution of NaCl is used to strip molybdenum from the organic phase. This requires regeneration of the organic extracting solution with sulfuric acid and the use of expensive alloys in process equipment that are not corroded by chloride ion.

U.S. Pat. No. 3,083,076 discloses the use of an aqueous solution of both sulfate and sodium hydroxide to strip molybdenum and vanadium from the organic solution. Again, this strip is chemically incompatible with the leach and requires corrosion resistant process equipment.

It has been discovered that an aqueous solution or bicarbonate anion is particularly effective for stripping both Group V and Group VI metals from organic solutions containing quaternary ammonium compounds. Bicarbonate provides high recoveries under mild conditions and is chemically compatible with the ammonical leach step in an overall process to recover metal values from spent hydroprocessing catalysts.

SUMMARY OF THE INVENTION

This invention provides a method of stripping an organic extraction solvent containing metal quaternary alkyl ammonium complexes. The organic extraction solvent is contacted with an aqueous stripping solution maintained at a temperature of no more than 50° C., and having a pH of between 7 and 9, and containing at least 75 grams per liter of a salt of a bicarbonate ion, for a time sufficient to convert the metal quaternary alkyl ammonium complexes to aqueous soluble metal complexes. The organic extraction solvent and the metal containing aqueous strip solution are then separated.

BRIEF DESCRIPTION OF THE DRAWING

FIG. 1 shows a flow scheme for an embodiment of this invention.

FIG. 2 shows in detail the flow scheme of this invention.

FIG. 3 shows Raman spectra of several solutions including two containing a new vanadium complex.

DETAILED DESCRIPTION

As world oil reserves dwindle, more heavy oil, with high concentrations of metals and sulfur, must be refined. One process, in the refining of such metals containing oil, is to contact with hydroprocessing catalysts to remove metals and sulfur. After a period of time, these catalysts do not give desired product quality and must be replaced. These used catalysts are herein defined as spent catalyst. Spent catalysts, from demetalation service, have relatively high amounts of metals deposited on their surface and also contain catalytic metals.

Metals recovered from crude oils are typically iron, nickel, and vanadium, and catalytic metals are generally molybdenum and cobalt or nickel. The metals can be leached simultaneously from spent catalyst that has been roasted to remove carbonaceous and sulfurous residues. An excellent leach system for spent catalyst is an aqueous solution of ammonia and ammonium salt. The pregnant liquor from the leach can be divided into two fractions: an aqueous solution of amine complexes of the cationic metals, nickel and cobalt, and an aqueous solution of anionic metal oxide ions, molybdates and vanadates.

If both molybdenum and vanadium are present, they can be removed together by liquid-anion exchange extraction techniques, using quaternary ammonium compounds as the extracting agent. By use of the present invention both metals can be extracted and stripped simultaneously. The individual metals can then be separated in later steps providing highly pure concentrates or crystalline materials.

The quaternary ammonium compounds of this invention can be made by the general method of U.S. Pat. No. 3,083,085.

In addition to the quaternary ammonium compound, the organic phase generally includes other materials such as a conditioner which typically is a long chain aliphatic alcohol such as capryl alcohol, decanol, tridecyl alcohol or 2-ethyl hexanol, and a diluent such as kerosene or high flash point fuel oils. The composition of the organic phase is not critical, but is generally preferred that it consists of from 5 to 15 volume percent quaternary ammonium compound, 2 to 10 volume percent of conditioner with the remainder being kerosene or fuel oil.

The stripping agent of this invention is bicarbonate, preferably ammonium bicarbonate. It has been found that singly charged anions in the aqueous strip solution remove metals more completely than anions with larger charge. Since bicarbonate is the singly protonated form of a polyprotic acid, pH control of the strip solution becomes critical. The preferred pH range is 7 to 9, more preferably 7.5 to 8.5.

The preferred stripping salt is ammonium bicarbonate, a temperature sensitive compound that can easily degrade to ammonia, carbon dioxide, and water. It has been found that, in the system of the present invention, stripping of the loaded organic solution is favored at lower temperatures. It is preferred that the temperature never go above about 50° C. and more preferably that the temperature not go above 25° C.

Bicarbonate ion will be present in at least 100 grams per liter and preferably in at least 75 grams per liter in the stripping solution. It is known that the more concentrated the stripping agent in the stripping solution, the more metal is extracted. Therefore, the optimum concentration for the practice of this invention is saturation. The stripping solution will be in contact with the organic for a period of time sufficient to convert the metal quaternary alkyl ammonium complexes in the organic solution to aqueous soluble metal complexes. The two solutions are then separated by means known in the art.

One advantage of using ammonium bicarbonate is that the ammonia and carbon dioxide constituents can be easily evaporated and recycled metal oxide. In an overall process using an aqueous ammoniacal and an ammonium carbonate leach where the organic reagent is circulated back to extract fresh metal, the use of bicarbonate does not foul the metal-free leach liquor with extraneous anions.

An interesting feature of stripping vanadium containing Alaquat ® is the formation of a unique chemical species unreported in the literature. The strip solution of an organic solution that contains vanadium has a characteristic light green color. This color is not due to any vanadium complex that is known to exist at these conditions.

The Raman spectrum provides further evidence of the unique character of this complex.

DETAILED DESCRIPTION OF THE DRAWING

FIG. 1 illustrates an embodiment of this invention. Shown is a total flow scheme for recovering metals from spent catalyst known to contain cobalt, nickel, molybdenum and vanadium. The catalyst is first roasted under conditions where the temperature is controlled to less than 600° C. The spent roasted catalyst is then leached at 90° C., until cobalt values in solution start to decrease. The pregnant liquor is then extracted with a quaternary amine, forming a first set of two streams: an organic stream containing molybdenum and vanadium, and an aqueous stream containing cobalt and nickel. The first organic stream is stripped by the process of this invention with an aqueous solution of ammonium bicarbonate. Hydrochloric acid is added to the aqueous strip solution and ammonium metavanadate is precipitated. The volume of the solution is reduced and ammonium molybdate is precipitated.

Excess ammonia is removed from the first aqueous stream, by heating the solution. The solution, which is exposed to air insuring that cobalt is in the trivalent oxidation state, is extracted with LIX 64N ®, removing the nickel and creating a second set of two streams: an aqueous, containing cobalt and any impurities and an organic containing nickel. The second organic solution is stripped with sulfuric acid, forming an acidic nickel containing sulfate solution. The cobalt in the second aqueous stream is reduced over cobalt shot, and extracted with LIX 51 ®, thereby forming a third set of aqueous and organic streams.

The third aqueous stream is recycled to the leach step, enriched in ammonia removed from the ammonia distillation step. The third organic stream is stripped with solution of a solution of ammonia and ammonium carbonate.

FIG. 2 shows another embodiment of the strip of this invention. An aqueous solution containing metal ions, including Group V and Group VI metal oxide anions, is contacted with a quaternary ammonium liquid anion reagent. The resulting organic metal containing solution is stripped by an aqueous solution of ammonium bicarbonate. The stripped organic solution can then be recycled without having had any extraneous ions placed into it by the strip solution. The result is an aqueous metal solution containing both the Group V and Group VI metal values.

FIG. 3 shows four Raman spectra. Spectrum A is that of an aqueous solution of 5 g/l V, as NaVO$_3$ at pH 8.8. The transition states were assigned as follows:

TABLE 1

| Transition Energy (cm$^{-1}$) | Intensity | Assignment |
| --- | --- | --- |
| 1047 | VS | NO$_3^-$ |
| 987 | W | H$_x$V$_{10}$O$_{28}^{(6-x)-}$ |
| 947 | VS | (VO$_3^-$)$_n$ |
| 713 | VW | NO$_3^-$ |
| 629 | VW | HCO$_3^-$ |
| 362 | W | VO$_3^-$ |
| 319 | W | VO$_3^-$ | where VS is very strong, S is strong, M is medium, W is weak and VW is very weak.

Spectrum B is that of an aqueous solution of 5 g/l V and 68 g/l NaHCO$_3$ at pH of about 8.8. The transition states of this solution, believed to be those of a new unreported vanadium complex were assigned as follows:

TABLE 2

| Transition Energy (cm$^{-1}$) | Intensity | Assignment |
| --- | --- | --- |
| 1064 | M | CO$_3^{2-}$ |
| 1046 | VS | NO$_3^-$ |
| 1014 | VS | HCO$_3^-$ |
| 923 | VS | V (V) carbonato complex |
| 718 | VW | NO$_3^-$ |

TABLE 2-continued

| Transition Energy (cm$^{-1}$) | Intensity | Assignment |
|---|---|---|
| 675 | VW | $CO_3^{2-}$ |
| 625 | VW | $HCO_3^-$ |
| 489 | VW | glass |
| 435 | M | V (V) carbonato complex |
| 354 | W | V (V) carbonato complex |

Spectrum C is that of an aqueous solution of 68 g/l $Na_4/CO_3$. The transition states were assigned as follows:

TABLE 3

| Transition Energy (cm$^{-1}$) | Intensity | Assignment |
|---|---|---|
| 1063 | M | $CO_3^{2-}$ |
| 1049 | VS | $NO_3^-$ |
| 1016 | VS | $HCO_3^-$ |
| 672 | VW | $CO_3^{2-}$ |
| 629 | VW | $HCO_3^-$ |

Spectrum D is that of an aqueous strip solution in pilot plant use of the present invention. The solution contained about 5 g/l V and 200 g/l ammonium bicarbonate. The transitions were assigned as follows:

TABLE 4

| Transition Energy (cm$^{-1}$) | Intensity | Assignment |
|---|---|---|
| 1063 | M | $CO_3^{2-}$ |
| 1019 | VS | $HCO_3^{2-}$ |
| 917 | VS | Vanadium V carbonate complex |
| 888 | sharp | ? |
| 674 | W | $CO_3^{2-}$ |
| 633 | W | $HCO_3^-$ |
| 438 | M | Vanadium V carbonato complex |
| 347 | W | Vanadium V carbonato complex |

EXAMPLE 1

This example shows the affect of varying bicarbonate concentrations in ease of stripping metals from a solution of 10% Aliquot in 10% decanol and kerosene loaded with both molybdenum and vanadium. Aqueous solution having the following concentrations of $NH_4HCO_3$ were made: 6.84, 13.68, 20.52, 100.0 and 200.0 grams per liter. An aqueous to organic ratio of 1:1 was used for all concentrations.

The results of the experiments are tabulated in Table 5.

TABLE 5

| [NH$_4$HCO$_3$] g/l | INITIAL Mo* | | FINAL Mo | | | INITIAL V* | | FINAL V | | |
|---|---|---|---|---|---|---|---|---|---|---|
| | pH | org(g/l) | org(g/l) | aq(g/l) | pH | pH | org(g/l) | org(g/l) | aq(g/l) | pH |
| 6.84 | 8.29 | 3.3 | 2.9 | 0.26 | 8.73 | 8.29 | 6.3 | 6.132 | 0.025 | 8.62 |
| 13.68 | 8.20 | 3.3 | 2.5 | 0.68 | 8.52 | 8.20 | 6.3 | 6.140 | 0.081 | 8.45 |
| 20.52 | 8.20 | 3.3 | 2.1 | 1.1 | 8.42 | 8.20 | 6.3 | 6.010 | 0.182 | 8.36 |
| 100.0 | 8.21 | 3.3 | 0.4 | 2.9 | 8.07 | 8.21 | 5.2 | 3.476 | 2.070 | 8.07 |
| 200.0 | 8.34 | 4.0 | 0.3 | 3.7 | 8.41 | 8.34 | 5.2 | 1.247 | 3.360 | 8.45 |

Analysis for metal concentrations in solution was done by Atomic Absorption.

EXAMPLE 2

Two organic solutions, one having 3.367 g/l of molybdenum loaded on 10% Aliquot in 10% decanol in kerosene, the other having 6.292 g/l vanadium loaded onto 10% Aliquot in 10% decanol in kerosene, and two aqueous solutions one with 20 g/l $NH_4HCO_3$ and the other with 200 g/l $NH_4HCO_3$ were made up. A variety of organic aqueous ratios were chosen and the results tabulated in Tables 6 and 7.

TABLE 6

| | | 20 g/l NH$_4$HCO$_3$ | | | 200 g/l NH$_4$HCO$_3$ | |
|---|---|---|---|---|---|---|
| Ratio | pH | org(g/l) | aq(g/l) | pH | org(g/l) | aq(g/l) |
| 15/1 | 8.97 | 3.019 | 1.389 | 8.70 | 2.517 | 9.412 |
| 10/1 | 8.93 | 2.994 | 1.459 | 8.52 | 1.562 | 14.182 |
| 5/1 | 8.87 | 3.189 | 1.540 | 8.35 | 1.036 | 11.871 |
| 2/1 | 8.59 | 2.606 | 1.318 | 8.22 | 0.431 | 6.096 |
| 1/1 | 8.40 | 2.217 | 1.097 | 8.09 | 0.248 | 3.315 |
| 1/2 | 8.19 | .570 | 0.808 | 8.02 | 0.151 | 1.743 |
| 1/5 | 8.19 | 1.182 | 0.428 | 8.03 | 0.100 | 0.705 |
| 1/10 | 8.19 | 0.660 | 0.266 | 8.00 | 0.119 | 0.350 |
| 1/15 | 8.17 | 0.635 | 0.179 | 8.00 | 0.127 | 0.234 |

Table 6 shows the data for stripping the Mo solution.

TABLE 7

| | | 20 g/l NH$_4$HCO$_3$ | | | 200 g/l NH$_4$HCO$_3$ | |
|---|---|---|---|---|---|---|
| Ratio | pH | org(g/l) | aq(g/l) | pH | org(g/l) | aq(g/l) |
| 15/1 | 9.03 | 6.412 | 0.162 | 8.52 | 5.228 | * |
| 10/1 | 8.97 | 6.306 | 0.175 | 8.35 | 5.326 | * |
| 5/1 | 8.6 | 6.144 | 0.179 | 8.32 | 3.850 | * |
| 2/1 | 8.44 | 6.080 | 0.177 | — | 2.310 | * |
| 1/1 | 8.53 | 6.104 | 0.178 | 8.10 | 0.743 | 5.700 |
| 1/2 | 8.25 | 5.715 | 0.151 | 8.03 | | 0.251 |
| 1/5 | 8.17 | 5.690 | 0.137 | 8.00 | 0.186 | 1.112 |
| 1/10 | 8.17 | 5.131 | 0.112 | 8.02 | 0.352 | 0.800 |
| 1/15 | 8.20 | 5.050 | 0.100 | 7.99 | 0.277 | 0.385 |

*Precipitate Present

Table 7 shows the data for stripping V from the organic. One usual feature of the 200 g/l $NH_4HCO_3$ strip noted is a greenish color not in the pregnant aqueous solution present in the 20 g/l $NH_4HCO_3$ solution. It is suspected that this may indicate the formation of a previously unreported vanadium species.

EXAMPLE 3

This example shows the results of costripping both Mo and V from loaded organic solvent with 200 g/l $NH_4HCO_3$ solution. An organic solution was prepared that had 3 g/l molybdenum and 6 g/l vanadium dissolved in a kerosene solution containing 10% Aliquot and 10% decanol. Various organic to aqueous ratios were tried. The data is tabulated in Table 8.

TABLE 8

| Ratio | pH | org(g/l) | aq(g/l) | org(g/l) | aq(q/l) |
|---|---|---|---|---|---|
| 15/1 | 8.49 | 0.168 | * | 5.175 | * |
| 10/1 | 8.51 | 0.077 | * | 4.226 | * |
| 5/1 | 8.52 | 0.104 | * | 4.664 | * |
| 2/1 | 8.29 | 0.051 | * | 2.166 | * |
| 1/1 | 8.16 | 0.030 | * | 0.750 | * |
| 1/2 | 8.01 | 0.015 | 0.083 | 0.321 | 3.048 |
| 1/5 | 8.03 | 0.008 | 0.034 | 0.234 | 1.305 |
| 1/10 | 8.00 | 0.007 | 0.016 | 0.211 | 0.603 |

TABLE 8-continued

| Ratio | pH | org(g/l) | aq(g/l) | org(g/l) | aq(q/l) |
|-------|------|----------|---------|----------|---------|
| 1/15  | 8.00 | 0.012    | 0.011   | 0.349    | 0.393   |

*an insoluble ppt formed

This example of the costrip of molybdenum and vanadium, shows the importance of having an organic to aqueous ratio of less than 1:2 to prevent precipitation of metals containing species, thereby providing conveniently processed metal-containing solutions.

EXAMPLE 4

The greenish solution of Example 3 was analyzed by Raman spectroscopy.

Raman spectroscopy provides strong evidence for a vanadium V carbonato complexes. Tables 1–4 show the Raman bands of some vanadium containing solutions and their assignment. All solutions were adjusted to pH 8.8 using either nitric acid or sodium hydroxide. Sodium bicarbonate solutions containing vanadium show an intense Raman band at 923 cm$^{-1}$ and a moderate bands at 435 cm$^{-1}$ and 354 cm$^{-1}$ as shown in FIGS. 3B and D. Neither vanadium-free sodium bicarbonate, FIG. 3C, nor bicarbonate-free metavanadate solution, FIG. 3A, showed these bands. In addition, we have noted that vanadium bicarbonate solutions usually have a characteristic light green color which we suspect is due to the complex.

What is claimed is:

1. A method of stripping an organic extraction solvent containing molybdenum and vanadium quaternary alkyl ammonium complexes comprising:
    contacting said organic extraction solvent with an aqueous stripping solution maintained at a temperature of no more than 50° C., a pH of between 7 and 9, and containing at least 75 grams per liter of a salt of a bicarbonate ion, for a time sufficient to convert said molybdenum and vanadium quaternary alkyl ammonium complexes to aqueous soluble metal complexes;
    separating said organic extraction solvent and said aqueous stripping solution.

2. The process of claim 1 wherein said salt of bicarbonate ion is ammonium bicarbonate.

3. The process of claim 1 wherein said organic extract solution contains tri-caprylyl methyl ammonium chloride.

4. The process of claim 1 wherein said bicarbonate concentration is at least 160 grams per liter.

* * * * *

UNITED STATES PATENT AND TRADEMARK OFFICE
CERTIFICATE OF CORRECTION

PATENT NO. : 4,434,140
DATED : February 28, 1984
INVENTOR(S) : Gale L. Hubred et al It is certified that error appears in the above-identified patent and that said Letters Patent are hereby corrected as shown below:

Col. 2, line 4, "both sulfate" should read --both sodium sulfate--.

Col. 2, line 9, "solution or" should read --solution of--.

Col. 2, line 14, "ammonical" should read --ammoniacal--.

Col. 2, line 43, "to contact with hydroprocessing" should read --to contact the oil with hydroprocessing--.

Col. 6, line 33, "One usual" should read --One unusual--.

Signed and Sealed this

Eleventh Day of June 1985

[SEAL]

Attest:

DONALD J. QUIGG

Attesting Officer

Acting Commissioner of Patents and Trademarks